INVENTOR.
CHARLES S. MORRISON
ATTORNEYS

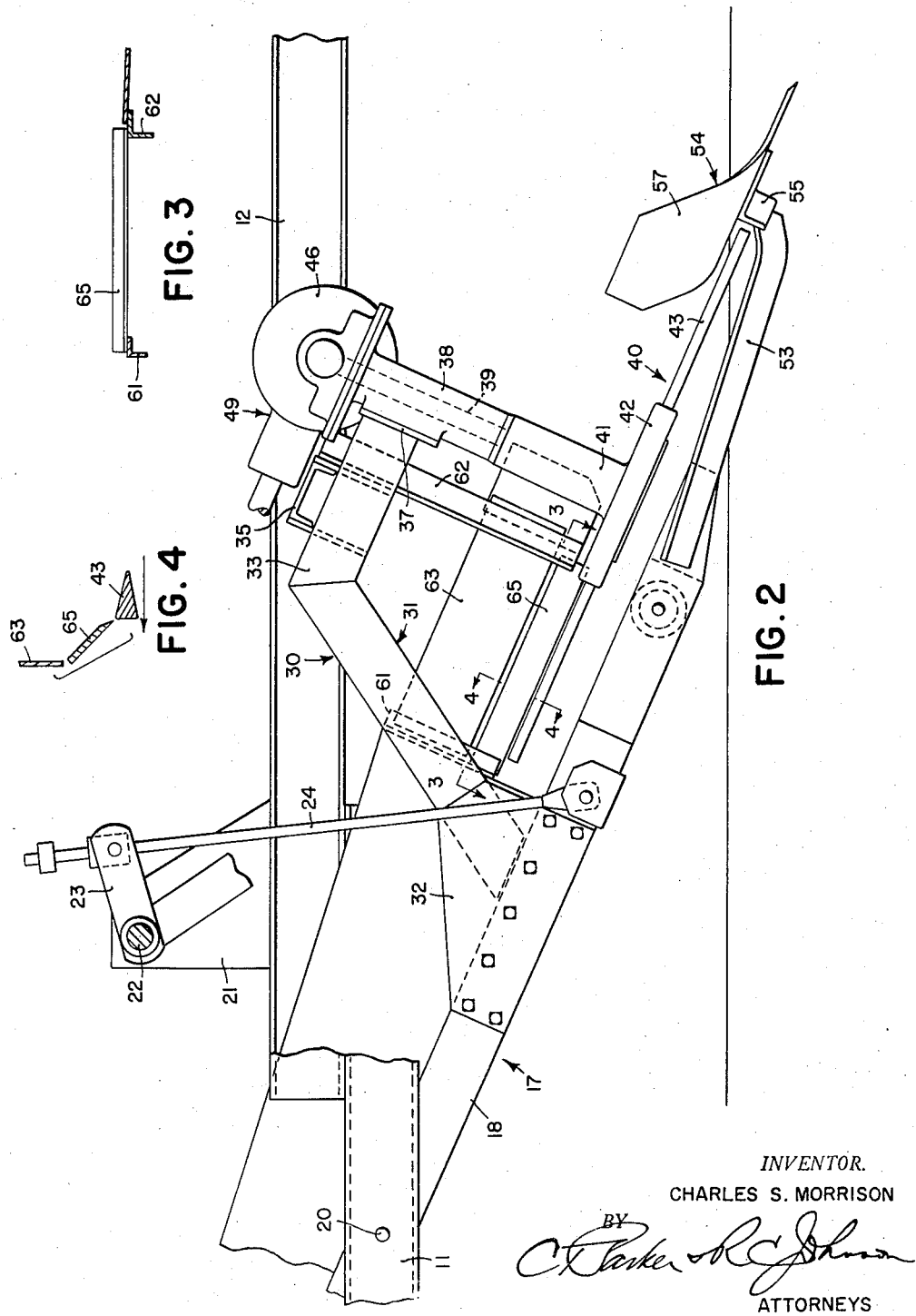

United States Patent Office 2,842,215
Patented July 8, 1958

2,842,215

POTATO DIGGER

Charles S. Morrison, Moline, Ill., assignor to Deere & Company, Moline, Ill., a corporation of Illinois Application May 7, 1956, Serial No. 583,070

7 Claims. (Cl. 171—115)

The present invention relates generally to agricultural implements and more particularly to harvesters for root crops and the like.

The objects and general nature of the present invention is the provision of a root crop harvester particularly adapted for two-row operation and, to that end, provided with forwardly disposed ground-entering shovel means, adapted to pass underneath the two rows of the crop to be harvested, and a pair of laterally spaced apart rotors, preferably of the open spoked type, arranged when driven to rotate toward one another and act not only to shake out or eliminate substantial quantities of soil and the like from the crop material but, in addition, to concentrate the mixture of crop, soil and other debris from the two rows into a single rearwardly moving stream or mass onto a single centrally disposed and relatively narrow rearwardly moving conveyor or elevator.

More specifically, it is an important feature of this invention to provide root crop harvesting means that includes a pair of laterally spaced apart rotors arranged to receive or pass under the crop material from the two rows and feed such material from each row against the material from the other row thereby not only concentrating the material from the two rows into a single relatively narrow rearwardly moving stream but, in addition, eliminating any requirement for stationary fences or the like against which the crop material in harvesters employing only a single rotor is directed. By virtue of moving the material from each row generally laterally toward the material of the other row, the crop material is thus cushioned, one stream against the other, with minimum bruising and the like, yet at the same time substantial quantities of adhering and accompanying soil and other debris are removed even before the combined streams of material are delivered onto the single generally rearwardly moving conveyor or elevator in which further soil elimination is carried out.

These and other objects and advantages of the present invention will be apparent to those skilled in the art after a consideration of the following detailed description, taken in conjunction with the accompanying drawings, in which:

Fig. 2 is a side view of the forward portion of the machine shown in Fig. 1, certain parts being broken away or shown in section to facilitate an understanding of the present invention.

Fig. 3 is a sectional view taken generally along the line 3—3 of Fig. 2, showing the support of the stationary knife that clears the spokes of the rotor of adhering vines and the like.

Fig. 4 is a sectional view, taken at an enlarged scale, along the line 4—4 of Fig. 2.

Figure 1:
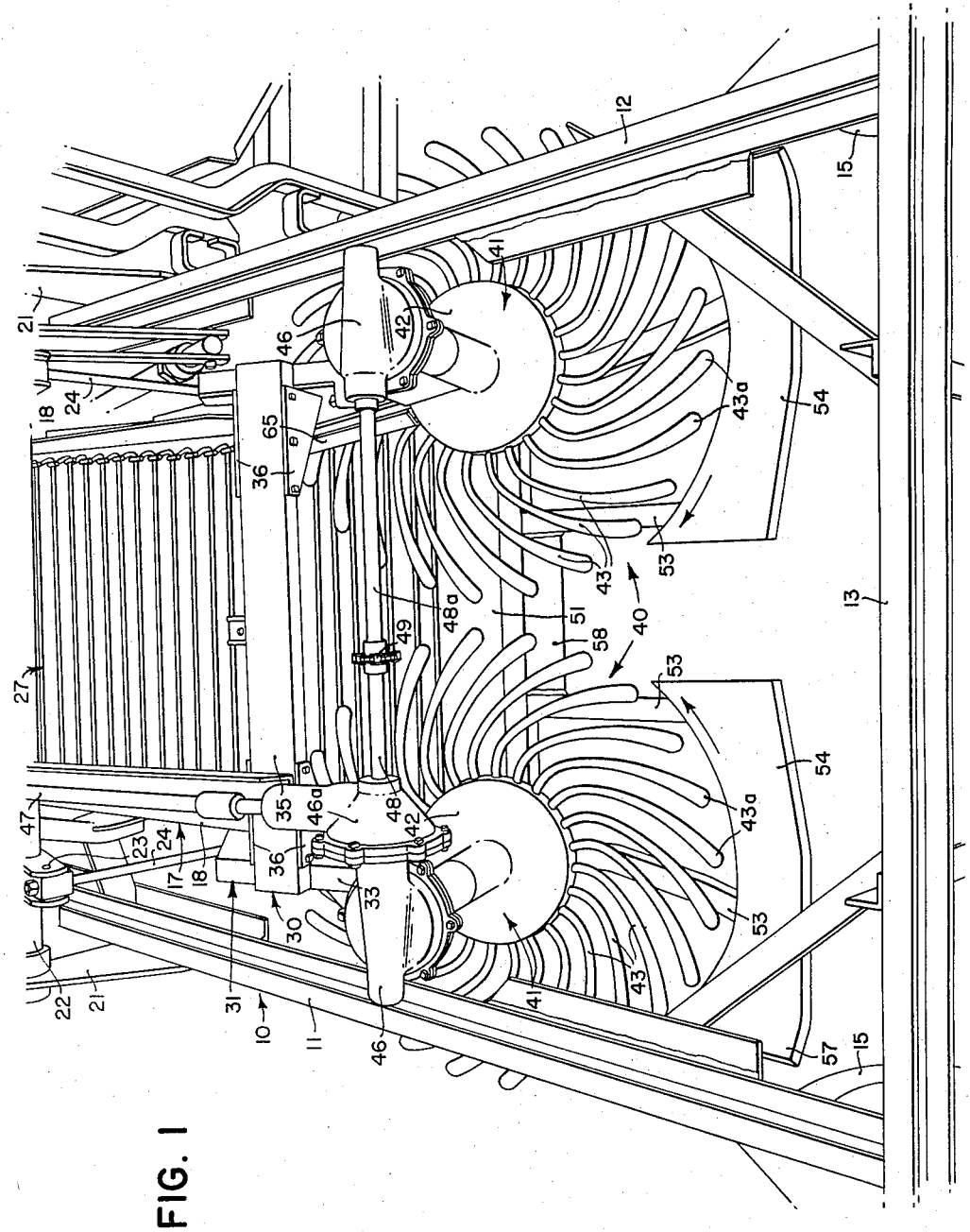
Fig. 1 is a fragmentary perspective view, showing the forward portion of a potato digger in which the principles of the present invention have been incorporated.

The potato digger in which the principles of my invention have been incorporated includes a main frame 10 that comprises among other things generally fore-and-aft extending side bars 11 and 12 suitably interconnected at their forward ends, as by a crossbar 13, and supported on caster wheels 15 or other suitable means. Normally, the harvester is hitched to a farm tractor or other suitable means. The main frame 10 carries a conveyor frame 17 that, like the frame 10, also comprises a pair of side bars 18, the conveyor frame 17 being disposed in between the main frame bars 11 and 12. The conveyor frame 17 is pivotally connected by pivot means 20 so that the front end of the conveyor frame 17 may be raised and lowered, as desired. Any suitable means may be provided for this purpose, but preferably a pair of brackets 21 is fixed to the side bars of the main frame and supports the rockshaft 22 to which arms 23 are fixed. The arms 23 are connected by links 24 to the forward portion of the conveyor frame, whereby rocking of the rock shaft 22 acts to raise and lower the front end of the frame 17. The conveyor or elevator preferably is of conventional construction, and is indicated in its entirety by the reference numeral 27. The conveyor or elevator is made up of what is commonly referred to as potato chain links operating over rollers or the like carried at the forward ends of the conveyor frame bars 18. As will be seen from Fig. 1, the conveyor or elevator 27 lies substantially in the central portion of the main frame 10 and is relatively narrow as compared with the width of the main frame.

An attachment frame 30 is adapted to be detachably connected with the forward portion of the conveyor frame 17 and comprises a pair of side members 31 of approximately Z configuration, each having a lower portion 32 attachable, as by bolts or the like, to the lower end of the conveyor frame 17. The upper portions 33 of the side members 31 extend generally parallel to the conveyor frame and are interconnected by a cross channel 35 to which gusset plates 36 are connected. By virtue of this construction, the attachment frame 30 is strong and rigid. A transverse plate 37 is fixed to the forward end of each of the upper attachment frame sections 33 and each receives a vertical sleeve section 38 in which a spindle 39 supporting an associated rotor 40 is disposed. Each rotor 40 is in the nature of a spoked wheel, each including a hub section 41 having an outwardly extending flange 42 that is apertured to receive fasteners, such as bolts, by which the radially inner ends of curved rod-like spokes 43 are fixed to become a part of the associated wheel. As shown, all of the spokes 43 lie in one plane, and thus the spoke sections of the two rotors or wheels lie in a common plane. If desired, however, the spoke sections can be angled downwardly slightly, which would facilitate passing the two merging streams of soil and potatoes toward or onto the central elevator 27.

The spokes 43 are curved, as shown, and their outer ends 43a are flattened in the plane of rotation, whereby the spaces between the radially outermost portions of the spokes are greater than the spaces between the spokes at the points where they are connected to the hub flange 42 by only a relatively small amount, sufficient to prevent clogging but not enough to lose potatoes. At its upper end, the right hand attachment frame supported sleeve section 38 receives a housing 46 that includes a bevel gear and pinion set by which the associated rotor is driven. The housing 46 also includes a housing extension 46a enclosing a bevel gear set that is driven from a power shaft 47, and extending from the housing 46a is a shaft section 48 that is connected through a flexible coupling 49 with an aligned shaft section 48a extending from the left hand housing 46. Referring to Fig. 1, it will be seen that the rotors 40 are driven so that their forward portions move laterally inwardly toward one another and the portions of the rotors closest to one another move generally rearwardly and rearwardly thereof move over the forward end of the conveyor chain 27.

The attachment frame 30 also includes a lower crossbar 51 to which the rear ends of two pairs of forwardly extending struts or supports 53 are fixed, as by welding or the like, and to the forward ends of the struts making up each pair a ground entering plate-like shovel 54 is fixed. Preferably, each shovel or plate 54 is fixed, as by bolts or the like, to an arcuate bar 55 that is welded or otherwise secured to the forward ends of the associated strut bars. Secured to the outer end of each plate or shovel 54 is a curved section 57 in the nature of a moldboard or deflector that gathers in the adjacent soil and included crop material. There is a space or clearance between the laterally inner ends of the two shovels 54, but nevertheless the shovels or plates are of sufficient size to pass underneath all of the crop material of the two rows. Any vines, trash or the like that may pass or tend to pass between the laterally inner ends of the two shovels or plates 54 are pressed downwardly by a deflector plate 58, carried by the central portion of the lower crossbar 51.

In operation, as the harvester passes down two adjacent rows of the crop to be harvested, the lower end of the conveyor frame is lowered to bring the shovels 54 underneath all of the crop, and the crop with any adhering and adjacent soil and other material passes rearwardly over the shovels. The outer ends of the rod-like spokes of the two rotors or wheels 40 pass just behind the rear edges of the two blades, and the spokes pick up the soil and crop and move the portion moving rearwardly over the associated shovel 54 laterally inwardly toward the material from the other row, and then the rotors bring the two streams of soil and other material toward one another and move them rearwardly onto the lower end of the conveyor 27.

It will be noted that the material from each row is moved laterally inwardly over against the material from the other row, which provides a cushioning action and insures the ultimate rearward movement of the crop material even though no fences or the like are provided for either of the rotors 40. The action of the rotors, particularly the spoked wheel construction thereof, is to separate or eliminate a substantial portion of the soil accompanying the crop material before the two combined streams of material are directed onto the conveyor 27. Here there is a further soil and debris elimination.

In order to prevent any material from moving laterally outwardly by the movement of the rear portions of the rotors past the edge of the associated conveyor, I provide a barrier that, as best shown in Fig. 3, comprises a pair of vertical members 61 and 62, the member 61 being fixed to an adjacent portion of the conveyor or elevator unit 17. Extending from the rear member 61 to the forward member 62 is a plate or shield 63 that is fixed in any suitable way to the members 61 and 62. The forward end of the plate 63 lies close to the hub section 41, as best shown in Fig. 2. Also secured to the members 61 and 62 is a lower member that is in the form of a knife or scraper 65 that is supported at an angle, as shown in Fig. 4, so as to act to shear off any streamers or other material that may hairpin about the rotor teeth 43. There is a barrier unit, such as the one just described, at each side of the conveyor unit 17, to prevent material from remaining on the rotor, but these relatively fixed barriers do not interfere with the movement of the main stream of material moving off the rotors and onto the elevator 27.

By removing the attachment frame and associated parts, the harvester of the present invention may be utilized as a loader for windrowed potatoes or the like, it being necessary only to pass down the row with the forward end of the conveyor lower to a point where it picks up all of the crop from the windrow. This is known as indirect harvesting and is used where it is desired to dig the potatoes, as from two rows, and combine them in one windrow when depositing the windrowed potatoes onto the ground where they may be permitted to remain for some time. On the other hand, with the attachment frame and associated parts of the present invention mounted on the harvester, the implement may be used as a two row direct harvester, digging the potatoes from two rows and combining the material into one rearwardly moving stream, separating the soil and trash from the potatoes and then delivering the potatoes into a truck or the like. Thus, one of the principal advantages of the present invention is the provision of an implement that may readily be used for both direct harvesting and indirect harvesting.

While I have shown and described the above preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. A potato digger comprising supporting frame means extending downwardly and forwardly, a pair of rotatable members disposed in side-by-side relation at the front portion of said frame means, the axis of rotation of said members being relatively fixed, each of said members having toothed elements arranged generally coplanar so as to facilitate passage of said rotatable member under potatoes while still in the ground, said pair of rotatable members lying substantially in the plane of said frame means, a pair of ground engaging blades fixedly connected with said frame means substantially directly ahead of said rotatable members and adapted to pass under the potato hills of two rows and direct the potatoes, soil, vines and the like onto the forward portions of said rotatable members, the major portion of said blades lying in a plane generally parallel to the plane of said rotatable members and lying just above said latter plane, means to rotate said members toward one another to concentrate said masses of potatoes, soil, vines and the like from two rows into a single stream, and centrally disposed conveyor means carried by said frame means in a position to receive potatoes, vines and the like from the adjacent generally rearwardly moving portions of said rotatable members.

2. A potato digger as defined in claim 1, further characterized by the teeth of said rotatable members having radially outer portions which are wider than the radially inner portions, thereby providing more nearly uniform spaces between the teeth through which soil, debris and the like may be separated from the potatoes.

3. A digger for root crops and the like comprising a mobile frame, transversely arranged shovel means carried by the frame at the front end thereof and adapted to pass under the surface of the ground and under the crop to be harvested, a conveyor carried by said frame in a position between the sides thereof and arranged to move generally rearwardly of the frame from a point rearwardly of and above said shovel means, a pair of disk-like rotors mounted for rotation in an approximately horizontal plane about approximately vertical laterally spaced apart axes, the rotors being arranged to rotate in substantially the same plane and driven so that their forward peripheral portions move laterally inward toward one another substantially directly behind said shovel means and at their adjacent portions generally rearwardly toward the forward end portion of said conveyor, the rear edge portions of said shovel means being substantially arcuate and disposed in relatively close proximity to the paths of movement of the adjacent portions of said rotors.

4. The invention set forth in claim 3, further characterized by said shovel means comprising a pair of transverse plates spaced apart approximately according to the row width of the crop to be harvested, said rotors being disposed substantially closely behind said shovel plates, respectively, and having crop-engaging fingers movable laterally inwardly along the rear edges of said shovel plates so that each rotor carries the crop material coming off the associated shovel plate laterally inwardly toward the crop material on the other rotor, the two masses of crop material being thereby merged and transferred to the forward part of said conveyor.

5. A digger for root crops and the like comprising a mobile frame, transversely arranged shovel means carried by the frame at the front end thereof and adapted to pass under the surface of the ground and under the crop to be harvested, a conveyor carried by said frame in a position between the sides thereof and arranged to move generally rearwardly of the frame from a point rearwardly of and above said shovel means, a pair of disk-like rotors mounted for rotation in an approximately horizontal plane about approximately vertical laterally spaced apart axes, the rotors being arranged to rotate in substantially the same plane and driven so that their forward peripheral portions move laterally inward toward one another behind said shovel means and at their adjacent portions generally rearwardly toward the forward end portion of said conveyor, said shovel means comprising a pair of transverse plates spaced apart approximately according to the row width of the crop to be harvested, said rotors being disposed substantially closely behind said shovel plates, respectively, and having crop-engaging fingers movable laterally inwardly along the rear edges of said shovel plates so that each rotor carries the crop material coming off the associated shovel plate laterally inwardly toward the crop material on the other rotor, the two masses of crop material being thereby merged and transferred to the forward part of said conveyor, each of said rotors including a central hub and a plurality of generally radially outwardly extending curved rods, the outer end portions of which are flattened so as to reduce the spacing between the rods at their outer ends, said frame means including a transverse bar passing underneath said rotors near their point of closest adjacency and forward of said conveyor, and a downwardly and rearwardly extending deflector plate secured to the central portion of said transverse bar.

6. A digger for root crops and the like comprising a mobile frame, transversely arranged shovel means carried by the frame at the front end thereof and adapted to pass under the surface of the ground and under the crop to be harvested, a conveyor carried by said frame in a position between the sides thereof and arranged to move generally rearwardly of the frame from a point rearwardly of and above said shovel means, a pair of disk-like rotors mounted for rotation in an approximately horizontal plane and said rotors being arranged so that the rear portions thereof pass over the forward end portion of said conveyor, the forward portions of said rotors lying substantially in the same plane as and directly behind the shovel means, and means extending forwardly from said frame and extending underneath the rotors to support said shovel means in substantially the same plane as that of the rotors.

7. A digger for root crops and the like, comprising a mobile frame, a conveyor frame carried by said mobile frame and extending downwardly and forwardly, conveyor means thereon, an attachment frame removably connected with the forward portion of said conveyor frame, a pair of disk-like rotors on said attachment frame and mounted for rotation in an approximately horizontal plane about approximately vertical laterally spaced apart axes, the rotors being arranged to rotate in substantially the same plane and driven so that their forward peripheral portions move laterally inward toward one another and their rear portions passing over the forward portion of said conveyor means, a pair of transverse shovels carried by said attachment frame and located, respectively, substantially directly in front of said rotors and lying substantially in the same plane therewith, adjacent ends of said shovels being spaced apart, and deflector means carried by the conveyor frame rearwardly of the space between said shovels.

References Cited in the file of this patent

UNITED STATES PATENTS

| | | |
|---|---|---|
| 1,256,642 | Barber | Feb. 19, 1918 |
| 2,463,447 | Walz et al. | Mar. 1, 1949 |
| 2,492,600 | Stauffer | Dec. 27, 1949 |